United States Patent
Lam

(10) Patent No.: US 9,457,281 B1
(45) Date of Patent: Oct. 4, 2016

(54) ELECTRONICS TOY PLAY SET

(76) Inventor: Peter Ar-Fu Lam, Torrance, CA (US)

( * ) Notice: Subject to any disclaimer, the term of this patent is extended or adjusted under 35 U.S.C. 154(b) by 756 days.

(21) Appl. No.: 10/660,967

(22) Filed: Sep. 12, 2003

Related U.S. Application Data

(63) Continuation-in-part of application No. 10/242,847, filed on Sep. 13, 2002, now Pat. No. 9,269,511, and a continuation-in-part of application No. 10/208,346, filed on Jul. 30, 2002, now abandoned, and a continuation-in-part of application No. 10/241,340, filed on Sep. 10, 2002, now abandoned, and a continuation-in-part of application No. 10/638,706, filed on Aug. 11, 2003, now Pat. No. 7,392,985.

(60) Provisional application No. 60/324,202, filed on Sep. 22, 2001.

(51) Int. Cl.
*A63F 13/92* (2014.01)
*A63F 13/95* (2014.01)

(52) U.S. Cl.
CPC .............. *A63F 13/92* (2014.09); *A63F 13/95* (2014.09)

(58) Field of Classification Search
USPC ........ 463/36, 37, 38, 43, 44, 45, 47; 273/85, 273/238
See application file for complete search history.

(56) References Cited

U.S. PATENT DOCUMENTS

| | | | | |
|---|---|---|---|---|
| 3,464,154 A * | 9/1969 | Di Leva | .................... | 446/158 |
| 4,541,633 A * | 9/1985 | Newbill | .................... | 273/238 |
| 5,067,079 A * | 11/1991 | Smith et al. | ................... | 463/3 |
| 5,190,285 A * | 3/1993 | Levy et al. | .................... | 463/36 |
| 5,411,259 A * | 5/1995 | Pearson et al. | ................ | 463/36 |
| 5,702,305 A * | 12/1997 | Norman et al. | ................ | 463/42 |
| 5,766,077 A * | 6/1998 | Hongo | ............................. | 463/30 |
| 5,779,515 A * | 7/1998 | Chung | ............................ | 446/90 |
| 5,853,327 A * | 12/1998 | Gilboa | ........................... | 463/39 |
| 5,897,437 A * | 4/1999 | Nishiumi et al. | ............... | 463/47 |
| 6,001,015 A * | 12/1999 | Nishiumi et al. | ............... | 463/38 |
| 6,007,428 A * | 12/1999 | Nishiumi et al. | ............... | 463/36 |
| 6,022,274 A * | 2/2000 | Takeda et al. | .................. | 463/44 |
| 6,102,397 A * | 8/2000 | Lee et al. | ...................... | 273/238 |
| 6,290,565 B1 * | 9/2001 | Galyean, III et al. | .......... | 446/99 |
| 6,435,875 B1 * | 8/2002 | Karussi | .......................... | 434/29 |
| 6,460,851 B1 * | 10/2002 | Lee et al. | ..................... | 273/238 |
| 6,461,242 B2 * | 10/2002 | Takeda et al. | ................. | 463/38 |
| 6,468,162 B1 * | 10/2002 | Nakamura | ..................... | 463/43 |
| 6,597,342 B1 * | 7/2003 | Haruta | .......................... | 345/157 |
| 6,650,870 B2 * | 11/2003 | White et al. | ................. | 455/41.1 |
| 6,773,325 B1 * | 8/2004 | Mawle et al. | ................ | 446/175 |
| 6,877,096 B1 * | 4/2005 | Chung et al. | ................. | 713/185 |
| 7,081,033 B1 * | 7/2006 | Mawle et al. | ................ | 446/175 |
| 2002/0052238 A1 * | 5/2002 | Muroi | ............................ | 463/40 |
| 2002/0086734 A1 * | 7/2002 | Krishnan et al. | ............... | 463/43 |
| 2004/0070625 A1 * | 4/2004 | Palombo et al. | ............. | 345/782 |
| 2004/0214642 A1 * | 10/2004 | Beck | .............................. | 463/40 |
| 2004/0248650 A1 * | 12/2004 | Colbert et al. | ................. | 463/37 |

\* cited by examiner

*Primary Examiner* — Tramar Harper

(57) ABSTRACT

A toy play set comprising a master toy member structured to interface with a family of accessory toy members. Each accessory toy member comprises an electronics identification means to be recognized by said master toy member. Each accessory toy member is also programmable to modify the personal characteristics of said accessory toy member according to a game play.

16 Claims, 12 Drawing Sheets

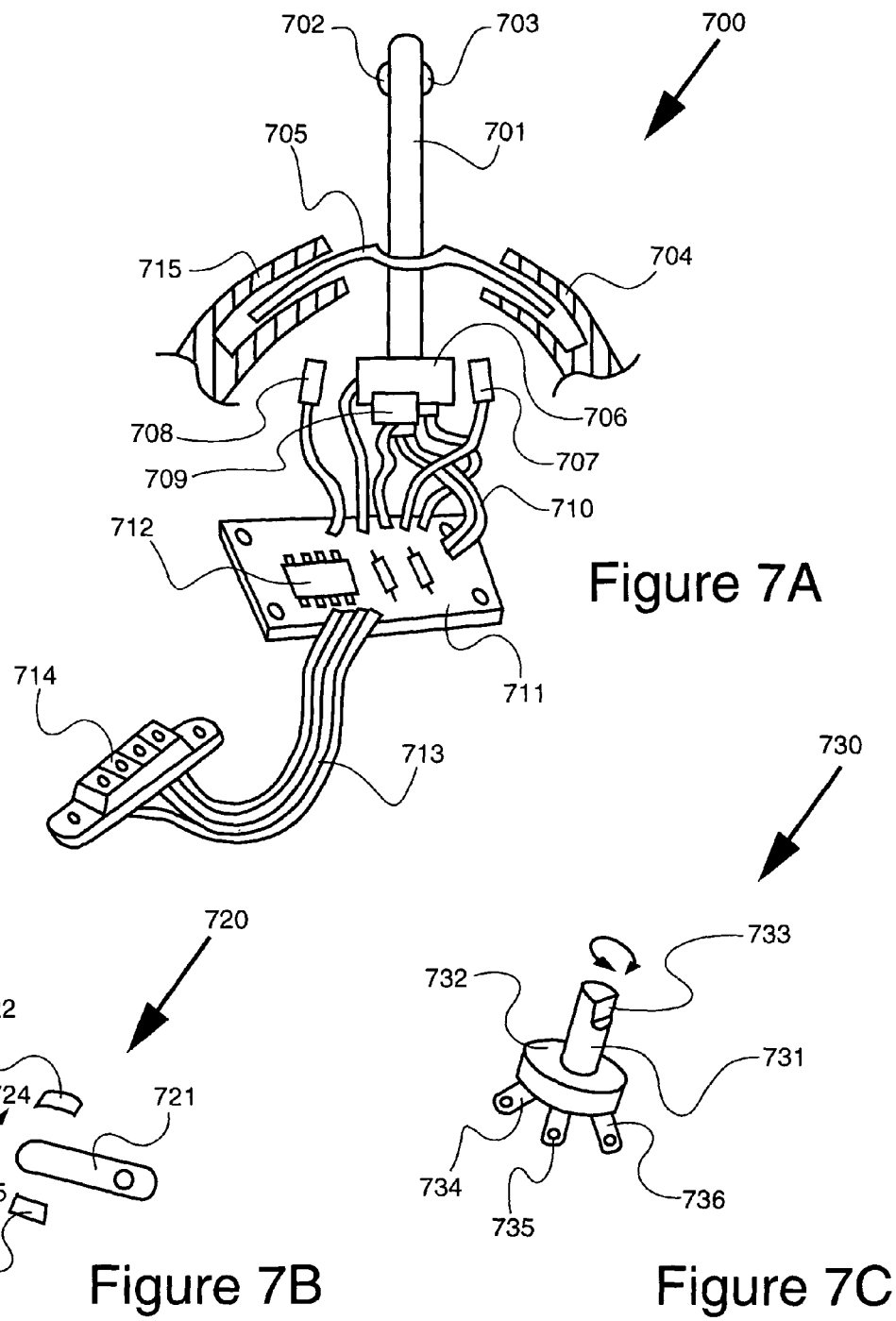

ELECTRONICS TOY PLAY SET

This is a continuation in part application of pending U.S. patent application Ser. No. 10/242,847 filed Sep. 13, 2002, which is the formal patent application of U.S. provisional patent application 60/324,202 filed Sep. 22, 2001. This is also a continuation in part of pending U.S. patent application Ser. No. 10/208,346 filed Jul. 30, 2002, Ser. No. 10/241,340 filed Sep. 10, 2002 and Ser. No. 10/638,706 filed Aug. 8, 2003.

FIELD OF THE INVENTION

The present invention relates to an electronics toy play set that comprises a portable master toy member and a family of accessory toy members.

BACKGROUND OF THE INVENTION

Traditional electronics interactive games categories are divided into arcade games, computer games, TV games and handheld games. Arcade games, computer games and TV games are provided with powerful computing devices and big screens. Portable games are mostly supported with a small LCD screen. All these electronics game platforms are suitable for providing competition games; combat games; strategic games and quiz games. Quiz games requires audio or visual transducer to provide questions and a feedback device to receive answer. Competition games require a user to compete with another user or compete with a virtual competitor provided by the game machine. Typical example of the competition games is a car racing game. Combating game is defined as the electronics games, which requires combating between two game objects such as combat vehicles or action figures. These figures are usually illustrated on the screen. One of the combating objects may be assigned to represent the user. Strategic games are defined as games that require a certain good level of strategy to win the game play. Control of the strategy is provided by proper key entries at appropriate time, proper selection of gaming subjects, such as racing vehicles or combating figures under different gaming environments. The different types of gaming environments and gaming levels that require different gaming strategies are collectively defined as the different game modes to challenge the user.

A significant advantage of arcade games, computer games and TV games is that the powerful processors behind the big screens are able to provide high resolution graphic images. The advantage of handheld game is portability that compromises with a small screen and lower resolution graphic. Portability is an important marketing factor. As compared with stationary units, special electronics and mechanical structures are required to make a product portable. Different issues such as power supply, weight and sizes are to be encountered when designing a portable game unit. It is the objective of this invention to introduce a portable electronics interactive game or play set that enables the user to play with realistic three dimensional toys, such as miniature racing cars and combating figures. It is also the objective of the subject invention to provide an interactive electronics games that challenge good strategy from the user.

U.S. patent application Ser. No. 10/242,847, a parent patent application of the subject invention disclosed a portable racing game that comprises a master member having a LCD screen and a game controller; and a family of accessory toys. In a preferred embodiment each accessory toy is configured in the shape of different racing vehicles. The user is required to select the most appropriate accessory toy to race under different environments, or gaming modes. Each of the accessory toys is provided an electronics identity circuit, typically represented by an IC or simply a resistor of specific value. When the accessory toy is connected to the receiver of the master toy unit, the microcontroller positioned inside the master toy unit reads the IC or the value of the resistor to determine which accessory toy has been connected for the racing game. The microcontroller provides different responses during the game play according to different types of accessory toy detected. Reprogrammable memory provided to the system allows the characteristics of the accessory toy to be upgraded or downgraded. Another enhanced play value to this configuration is that the accessory toy can be traded among different players, or users.

U.S. patent application Ser. No. 10/208,346 filed Jul. 30, 2002, Ser. No. 10/241,340 filed Sep. 10, 2002 and Ser. No. 10/638,706 filed Aug. 8, 2003 discloses circuits that identify a toy object or an accessory toy member according to the resistance of a resistor attached to this toy object. They also disclosed applications for a single master toy unit to receive multiple accessory toy members, and the technical solution for multiple accessory toy members to be interfaced with the master toy unit at the same time. These parent patent applications also disclosed an encoded pictorial game card to define different game modes. Each game mode directs the microcontroller inside the master unit to initiate a different gaming environment, or adopting a set of different game rules to interact with the accessory toy members selected.

SUMMARY OF THE INVENTION

The present invention is firstly directed to a master toy member configured to work with any member selected from a family of accessory toys. In an exemplary embodiment, each accessory toy member representing a racing vehicle is provided an electrical circuit. A first characteristic of this system is that there is no battery required inside the accessory toy for the internal electrical circuit to perform it's normal function. A second characteristic of the system is that the accessory toy itself is used as part of the joystick, for example, a hand controller for the user to control, steer or race the vehicle. A third characteristic of the system is that each accessory toy member can be reconfigured or upgraded electronically, and the upgraded accessory toy member can be traded with other players.

In a first preferred embodiment, an interactive electronic racing play set comprising a stretch fabric glove attached with two finger contacts and a power module which houses an LCD display, control buttons, batteries and a speaker. The play set further comprising a base/joystick and a family of racing vehicles. The object of this game is to race the clock or with multiple opponents on a selected racetrack for points. Earned points can be converted into upgrades that can be applied to vehicles such as cars, trucks or motorcycles.

Typical car size is 36th scale or at a size that is comfortable to be held against the palm of a player. The glove that is equipped with contact points at the index finger and the thumb interacts with the car. When a vehicle is picked up with the glove, the power inside the controller box of the glove, or the master toy member is fed to the vehicle through the finger contacts. An identification circuit built inside the vehicle such as an integrated circuit (IC) or an identity resistor will identify the vehicle to the master controller box of the glove. Engine noises and racing sounds personalized to the particular selected vehicle can then be generated by the circuit stored inside the master toy member.

Next, the master toy member may ask if the player wants to race or look at the inventory. If race mode is selected, the further options are for multiple or single player modes. If the multiple players mode is selected, it will ask the players to shake hands with opponents to register and synchronize the racing clock on each controller. Each player must select the same track. The player must place the car onto the base, which houses a joystick for forward and reverse control. Twisting the car will determine the steering direction. The racetrack is displayed on the LCD screen, located on top of the controller box. The control signals input through the car are conducted to the controller box through the finger contacts. These signals move an icon along the racetrack. The control mechanism can be built Inside each vehicle or inside the joystick base. The winner is who finishes the race first with the least mistakes, or with the best score. The game is not limited to regular racetracks. Typical adventure games to score point can be included in the competition. The games control program that directs the game play is stored inside a program storage memory. In a preferred embodiment, this game control program defines the different performance level of different racing cars according to their different identities detected. A mode selection button selects different racetracks or games. Additional racetracks or games can also be provided through additional external cartridges. According to this description herein and the understanding of a person having ordinary knowledge in the art, the definition of mode selector for selecting games is explicitly defined to be selecting means provided for selecting different games to be played, or selecting different modes of a game to be played. This definition specifically exclude art recognized power switch which merely provided to turn the power of the unit on or off. The challenger, who is also the timekeeper, shakes hands again with all the opponents to determine the winner. The challenger also will pick up all the scores at the end of the race. The handshake, a sign of sportsmanship, is in fact a mode of transferring digital information from glove to glove. Each glove has two contacts, one on the index finger the other one on the thumb. In addition, each glove has two additional conductive patches. By shaking hands, the contacts of one glove will touch the patches of another glove, thus enabling information exchange. The winner will be awarded points, which he can compile or exchange for upgrades or modifications. To encourage team play, the points awarded in multiple players mode is much higher than the solo mode, at which the player races against the clock.

Typical examples of vehicle enhancement are upgrading of tires, suspension, exhaust system, handling mechanism, steering angle, turbo engines, high torque transmissions, vehicle body weight and brakes. Each vehicle in the product line may have different personal characteristics, which are defined by personalized parametric data stored in a memory. For example, the binary number 101 in the memory area defining the steering angle may represent a maximum steering angle of 30 degree, while the binary number 100 represents a maximum steering angle of 25 degree and so on. The binary number 01 programmed in another memory location indicates that the car is provided with a level 1 turbo charge engine. The number 00 stored in the same location means the car is equipped with a regular engine. The master toy unit having a LCD screen provides a variety of racetracks; each also has a different personality and game rule. A first racetrack simulates off road conditions while another racetrack tests the acceleration capability of the vehicle. A suitably upgraded vehicle will perform better in a particular racetrack. Accordingly the game play requires the player to plan for good strategy, and build a vehicle that best fit the nature of the racetrack. To enhance fun of the games, a complete game is recommended to include a number of racetracks, and each vehicle is allowed to appear only in one racetrack. The exciting part of the game is that a proper strategy and planning is required to put appropriate vehicles on the different racetracks according to their characteristics. Accordingly different personal characteristics of an accessory toy member will provide different strategic response during the game play according to the carefully designed strategic game program.

To further enhance the play value, although the features of each vehicle are upgradeable, not all vehicles are capable to be upgraded to provide the maximum performance for every upgradeable feature. For example, the best turbo engine of car A may deliver a maximum power of 500 horse power while that of car B is just 420 horse power. However, the steering angle upgradeable for car A is 25 degree while that of car B is 32 degrees. It means car B is more responsive to sharp curves driving than car A. The upgraded features are preferred to be stored in a memory device located inside the vehicle. The car can then be traded with any players in exchange of points, or money represented by the points. Alternately, the upgrade record of a vehicle can be maintained at the memory located inside the master toy unit, the controller box attached to the glove. In this case, the trading of the vehicle requires a communication system between two master toy units for registering the title change. An unusual example of the communication system is a title change handshake that transfers the ownership of a car from a first glove to a second glove in exchange for the points from the second glove.

In an alternate embodiment, the master toy controller box equipped with the LCD display is placed at the side of the hand controller. A connector interfaced the controller box with the electrical circuit built inside the vehicle and also the driving control signals. In this situation, data exchange between controller boxes can be achieved by wired or wireless communication channels. Alternately, the controller box can be removed and reattached to the glove for the handshake mode of data exchange.

The personalized sounds generated by each vehicle during the game play can be embedded inside the electrical circuit of each vehicle or stored inside the master controller box. A timer counter or clock keeping track of the playing time record for each vehicle is preferred. If a vehicle is not run or raced for a certain time, the upgradeable features of the vehicle may be degraded, a sign of lack of practice and maintenance. The player is required to pay for maintenance to bring the vehicle back to it's original condition. This provision encourages the player to regularly playing with all the vehicle collections in order to keep all the vehicles at it's premium conditions ready for racing.

Although a play set of racing vehicles are used to demonstrate the invented technology, other embodiments of the accessory toy members including dolls, action figures, toy characters, airplane, helicopter, toy size electrical hand tool or other different toy articles. Different game rules are designed for working with different type of accessory toy members. A motor can also be included in many of these toy articles to provide different motional responses. For example, a motor can be installed together with the joystick mechanism or with the glove to provide vibration feeling, or to support other kinds of animation.

It should also be noted that the glove attaching the master controller box and the conductive fingertips could be structured in other different forms without sacrificing the merit of the invention. As compared with traditional hand held LCD games, the play set enables the involvement of physical miniature size objects, such as toy size motor vehicles. Identity and personalized characteristics can be stored inside the physical objects. In addition, the toy size vehicles is becoming an important part of the driving and steering mechanism during the race. Actually "driving" the vehicle gives the player more real feeling than regular hand controllers. The introduction of finger contacts for a controller box to communicate with the physical object, the joystick base or a second controller box brings the fun of the play set to a new level. The finger contact design can be achieved in different ways including but not limiting to attaching conductive finger contacts to a glove.

In another preferred embodiment, a hand held game unit is provided for one or more racing cars to be placed on a movable platform. Beneath the movable platform is a motorized moving mechanism designed to move the racing vehicles so as to simulate the racing movements. A push button switch toggles through different racetracks and racing conditions. Car racing graphics are displayed on a LCD screen. The LCD screen can also be used to provide alphanumeric display to facilitate data entry or to prompt control selections. Control buttons are provided for the user to input data and control the movements of the racing vehicles. A game program is provided to control the racetrack condition displayed. This program also controls the movement of the platform according to the type of racetrack selected. A microcontroller installed inside the master game unit executes this game program, which is stored inside a program memory. Most hand held games makes use of lower cost read only memory (ROM) to store the game program for costing reason. When two racing car receivers are provided, the racing car selected by the user is connected with a first receiver of the game unit. The second receiver of the game unit receives a competing racing car specified by the master game unit, or by a second user. The performance of a car is determined by the personal characteristics of each racing vehicle selected, and how these personal characteristics fit with the nature of the racetrack. A reprogrammable memory is provided to store or upgrade the personal characteristics of the racing cars. These characteristics can be changed from time to time according to the upgrade and maintenance efforts provided.

In a further embodiment, two movable platforms are provided so that each racing car is able to move independently. Two sets of hand controller are provided for two users to race at the same time. The hand controller can be provided on top of the master game unit, or designed as detachable components apart from the unit. Alternately a socket can be provided on the master toy unit for the user to plug in a hand controller. Instead of using a selection button to select the racetrack, a printed card showing the nature of the racetrack defines the racetrack selected. This printed card provides identity means such as bar code; magnetic strip or photo interrupted coding taps to be read by the master game unit. After a race game is completed, a different racing card is inserted to initiate another type of racing game.

A memory device is required to store the data defining the personal characteristics of the racing car. The capability to upgrade or downgrade the capabilities of the racing car adds fun and challenges to the game play. This memory device is preferred to be installed inside the individual racing car so that an upgraded car can be traded with a second player. Nonvolatile memory is relatively expensive. For toy applications that cannot afford to have a separated memory device provided for each accessory toy, data representing the personal characteristics of all the different cars belong to a user can be stored inside a single, removable memory cartridge that is plugged into the master game unit. This is a cheaper solution because one memory cartridge enables a user to store data representing all the personal characteristics of a whole collection of racing vehicles. According to a person having ordinary knowledge in the art, the above description clearly distinguished the difference of an accessory toy member, such as the racing car described herein as compared with a memory cartridge; and that the definition of a memory cartridge should not include any accessory toy member for avoiding confusion in the above description. Before a game play, different users plug in their removable personal cartridge into the master game unit for the users to participate the game play. Trading of a vehicle simply requires a step to transfer the title and personalized data of a racing car from one user cartridge to another user cartridge.

In another alternate embodiment, each portable master game unit is provided all the key components, including the LCD display screen, the hand controller, the movable platform equipped with a receiver to interface with the identity circuit of a racing car. Internal to the master game unit are the memory device storing personalized data of all the racing cars belong to the user and the memory storing the racing program. This game unit is adequate for the user to play solo. When racing between two users are required, the two master game units communicate through a communication link connected in between.

Although the master and accessory toy play set concept applies to car racing games. The electronics and mechanical structure also enable the game unit to work with action toy figures, quiz games and education toys. In another preferred embodiment that works with male action games, the racing car described are replaced by two action figures. Each action figure is defined with specific personal characteristics that can be upgraded or downgraded. Different game rules to upgrade or downgrade each action figure are carefully defined to enhance the game play value. More than two receivers and multiple action figures can be arranged to provide a more complex strategic game play. In yet another preferred embodiment, instead of using two memory storage cartridges to store the data defining the personal characteristics of different accessory toy members, two miniature portable master game units can be plugged into a larger master toy unit that receives an array of accessory toys.

The upgradable toy design not only adds play value to the toy play set, it also offer unparallel advantage to the marketing planning of launching a new toy series. In a preferred method of marketing, a master toy member is launched together with a first series of accessory toy members, each predefined with a certain capability characteristics. When the toy series is well accepted by the market, there is always a drive to offer second or third generations of the toy series for the toy company to generate new revenue. Overhauling a toy series is challenging that imposes a risk for toy companies because users are required to abandon the old toys that they have. According to this invention, a second series of accessory toy members can be added to supplement the original play set previously launched. In order to attract the users to buy new accessory toy members, the new accessory toy member can be enriched with specific super capability, such as higher engine power that can overcome some steep slope. The game can be further programmed such that any accessory vehicle in the first launch is not able to overcome some specific challenges; only a specific super power vehicle offered in the second launch is capable to achieve a new level of a game play.

Accordingly, an invention is disclosed for an electronics toy play set to have a master toy member, and a series of accessory toy members. Each toy member is provided with memory means storing data defining the personal characteristics of the accessory toy member. An interfacing circuit allows the master toy member to receive multiple accessory toy members at the same time and be able to identify the characteristics of each accessory toy member according to the electronics identifying circuit built inside each accessory toy member. The play set is further equipped with a program storage device that store the game program. A mode selection button, switch or a picture card enables the master toy member to define the game mode for the external accessory toy members received. Various configuration and decoration for the master toy member, hand controller, accessory toy members, communication channels are possible. The novel features of the invention are set forth with particularity in the claims to be followed. The invention will best be understood from the following description, when read in conjunction with the accompanying drawings.

DESCRIPTION OF THE DRAWINGS

FIG. 7A illustrates the internal structure of a joystick embodiment for use with the preferred embodiment of FIG. 2;

FIG. 7B illustrates the an electrical circuit to indicate driving direction;

FIG. 7C illustrates a rotating resistor potentiometer; an alternate electrical circuit to provide analog or digital proportional driving information;

DETAILED DESCRIPTION

Figure 1:
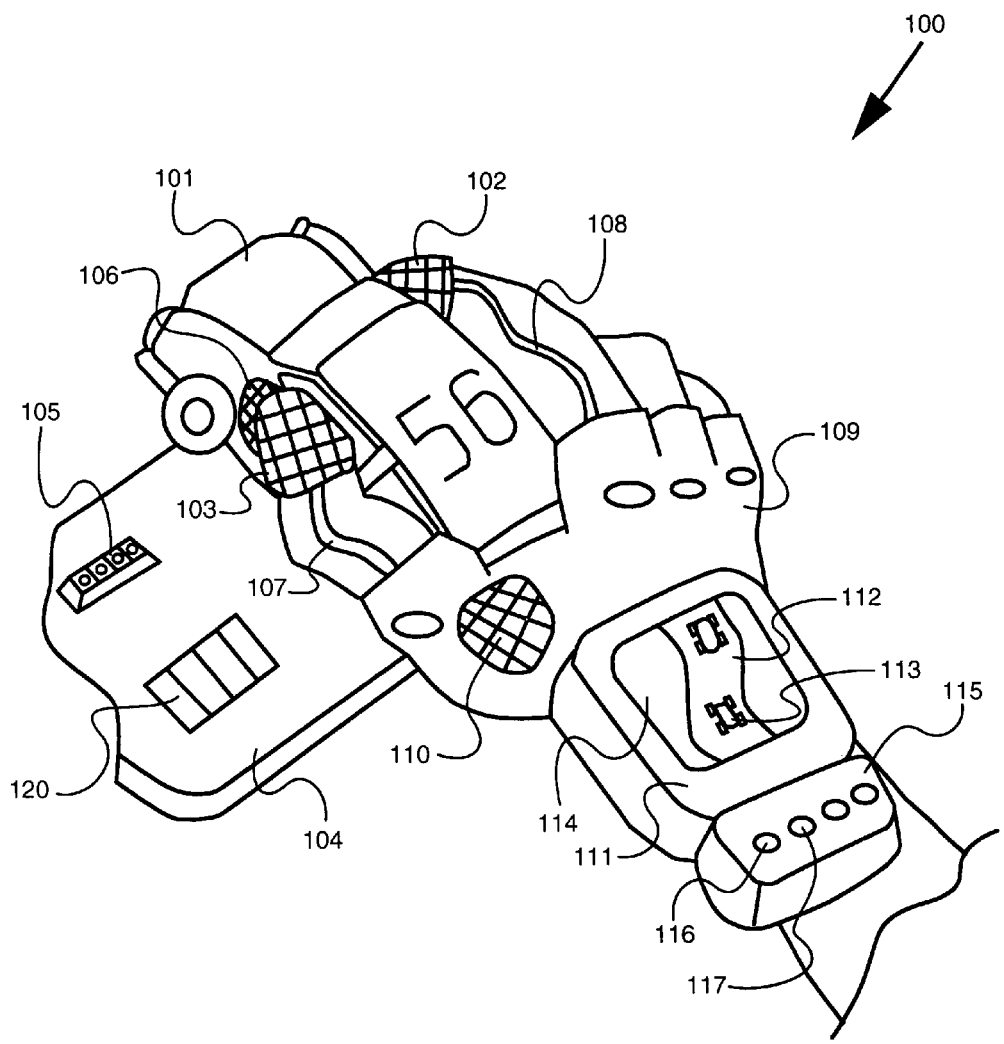
FIG. 1 is an embodiment having a master controller attached to a glove; the accessory toy vehicle is contacted by the finger contacts connected to said controller.

Attention is initially directed to FIG. 1, which depicts a play set comprising a master controller embodiment and an accessory vehicle embodiment. The master controller embodiment is represented by the master controller box 111 having a LCD panel 114, the glove 109 and the finger contacts 102 and 103. The accessory vehicle embodiment is represented by the racing vehicle 101 connected to a joystick supporting base 104. The master controller box 111 is attached to a glove 109 by velcro or other attachment means. A LCD panel 114 is provided on top of the master controller box 111 for displaying a game play such as a racetrack. Buttons 116 and 117 enables the player to select options, different play modes or to provide responses according to the request of the game play.

More than one accessory vehicles, each has a different personality are provided for the product line. In a game play example, the hand wearing the glove 109 picks up the vehicle 101. The master controller box 111 is interfaced with the internal electrical circuitry of the vehicle 101 through the finger contacts 102, 103 with the conductive pads 106 located on the two sides of the vehicle. An electronics identity circuit inside the vehicle enables the master controller box 111 to identify which vehicle was picked up. Electronics identity means is defined as any structure that enables a master toy to recognize the identity of an accessory toy with a circuit that carries electric current. The vehicle is then connected to a joystick mechanism located on the joystick base 104. The relative movements of the vehicle 101 against the joystick base 104 is converted in to vehicle movement control signals such as acceleration, braking and steering. These control signals are fed to the master controller box 111 through the finger contacts 102, 103 and 106 between the glove and the vehicle. The received control signals directs the movement of the icon 113 that represents the vehicle 101 racing on the race track 112. The connector 105 and velcro 120 are provided as an option for the master controller box 111 to be connected to the base 104 instead of being attached to the glove 109.

It should also be noted that each glove 109 is preferred to have a pair of conductive pads, one on each side of the hand. Conductive pad 110 locates at the backside of a hand. These conductive pads are provided for exchange of information in between the controller boxes between players. It should be noted that in this embodiment only two conductor lines are provided for the data communication and power supply purposes. There are different data information to be communicated in between these two lines in both directions. Accordingly, the data flowing through this communication channel are arranged in the form of data packets transmitted in serial format. Handshake signals or directional control signals are also required in between data packets to properly handle the direction of information flow.

Figure 2:
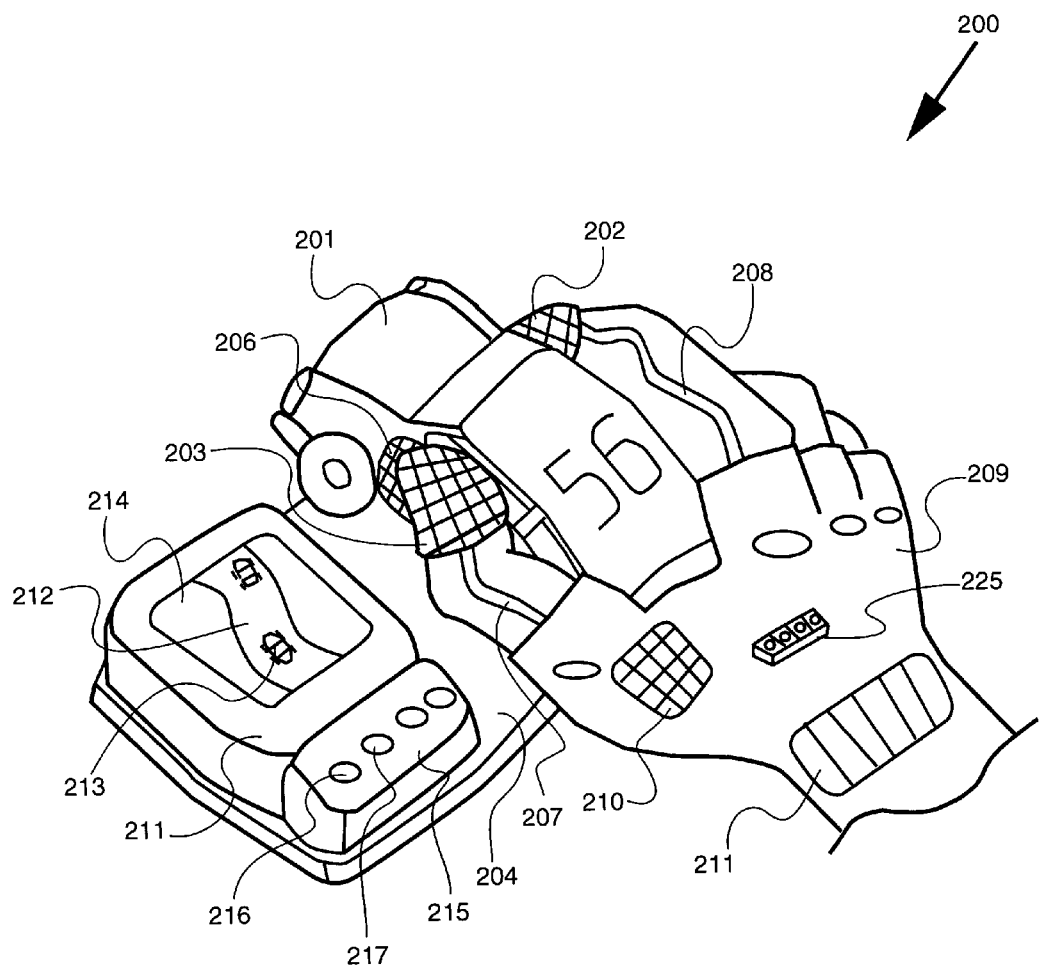
FIG. 2 illustrates another preferred embodiment of said vehicle play set making use the accessory vehicle as part of the joystick mechanism for driving control.

Attention is now directed to FIG. 2 illustrating the alternate embodiment for the master controller box 211 to be located on the joystick base 204 instead of the glove 209. The power supply and also the control signals in between the master controller box and the racing vehicle 201 are interfaced through the socket 105 as shown in FIG. 1 and another mating socket located beneath the master controller box 215. Normally the power supply is preferred to be positioned inside the master controller box.

Although the master controller box 211 is shown as a configurable design allowing the unit to be attached either to the joystick base 204 or the glove 209, it is the desire of another preferred embodiment to integrate the master controller box 214 with the base unit 204. In this case the handshake data exchange operation is preferable to be replaced by a wired or wireless communication links in between two controller boxes. Typical wireless communication link are represented by infra red, ultrasonic or RF communication links.

Figure 3:
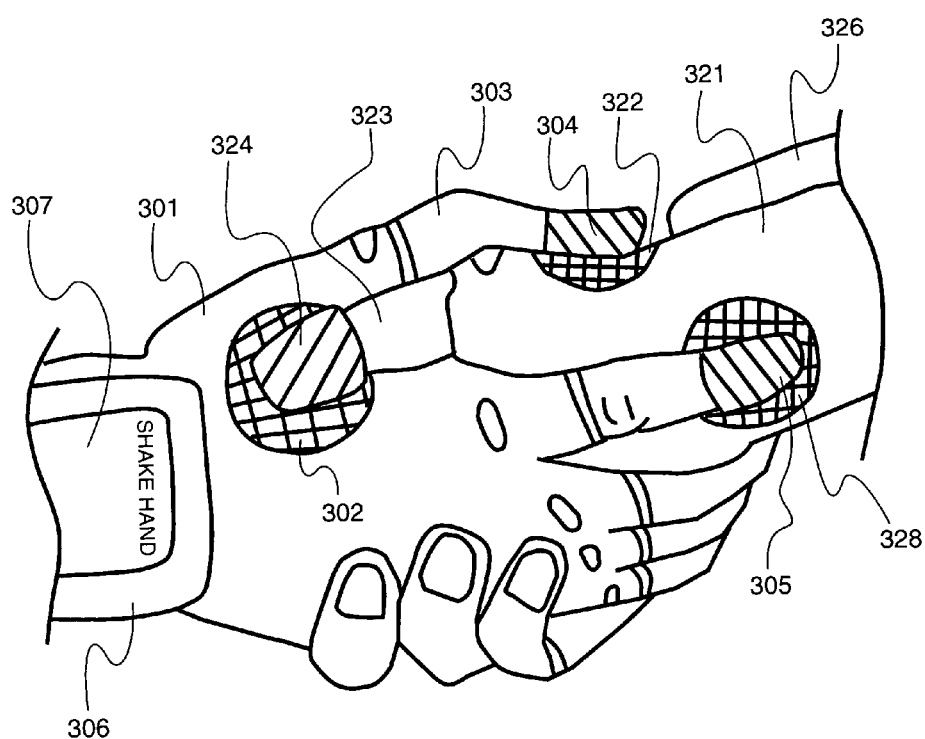
FIG. 3 illustrates how the finger contacts interface two controller boxes through a handshake.

Attention is now directed to FIG. 3, which illustrates how a sportsmanship handshake enables the data transfer and synchronization between two master controller boxes. When the LCD displays of two different master controller box are programmed to show data exchange, the players are prompted to start exchanging the information be shaking hands. As illustrated by FIG. 3, the thumb contact 304 of player A is in contact with the conductive pad 322 of user B. The forefinger 305 of player A is in contact with the conductive pad 328 located at the palm side of user B. Similarly the thumb and forefinger of user B are also in contact with two conductive pads connected to the master controller box of user A. Accordingly four conducting paths are provided in between the two master controller boxes allowing data to flow in two directions. Before a car race is initiated, player A and B shake hands. This action synchronizes and starts the racing start count down clock inside the two master controllers. Players A and B may shake hands with player C and D to download their count down clock value into the racing count down clocks of players C and D. Accordingly the count down clocks of all the players are synchronized that will command the LCD panels and the master controller boxes of all the players to start the racing game at the same moment. After the racing is over, the leading player shakes hand with each of the other players and their scores are compared and the winner will be announced. During another hand shake with the final winner, the winner's master controller box is allowed to deposit a generous sum of money represented by winner's reword points. The winner is then able to make use of these reward points to upgrade any vehicle he possessed. Suppose a player run short of points, or money that is represented by points in the game, the player is able to trade one of his car with another player for a particular amount of points. After a handshake, the title of the car and the agreed amount of points will be exchanged.

Figure 4A:
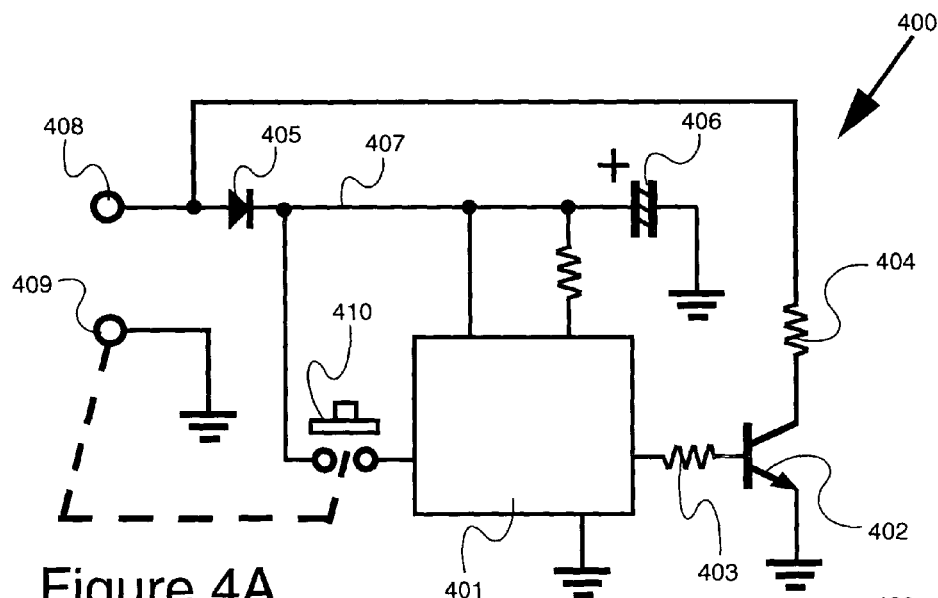
FIG. 4A is an embodiment of an interface circuit built inside an accessory toy member.
Figure 4B:
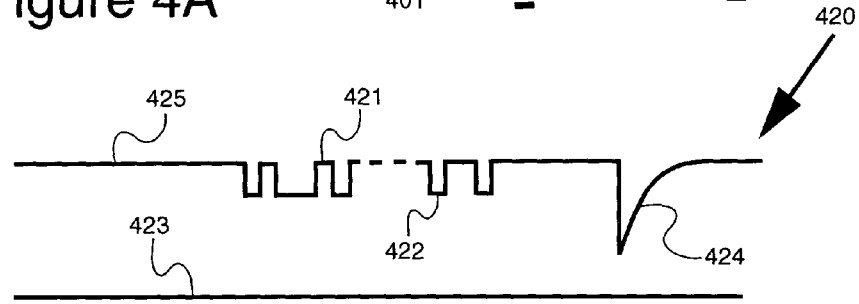
FIG. 4B is the waveform of the electrical current flowing through the contact terminals and the interface circuit of FIG. 4A.

Attention is now drawn to FIG. 4A illustrating a preferred embodiment of an electrical circuit 400 included inside the body of an accessory vehicle. This circuit is able to generate digital signals when power is received. The digital signal can be used for signaling the identity of the vehicle or to serve other applications. The contact terminals 408, 409 represents the conductive terminals positioned at the two sides of the vehicle, such as the contact terminal 106 of the toy car 101 in FIG. 1. The heart of the circuitry is a microcontroller 401. The microcontroller is powered by the external voltage obtained from terminals 408 and 409. The microcontroller directs the game play according to game program stored in an internal or external program storage memory device. The capacitor 406 is included as a filter and also a power reservoir to store electrical energy when the contact terminals are momentarily out of contact. When power is connected to the contact terminals 408, 409, the microcontroller is powered up. At this moment, the voltage waveform across the terminals 408 and 409 is illustrated in FIG. 4B. Once the electrical circuit is stabilized, the microcontroller 401 generates a series of pulses 421 and 422 according to the nature of the accessory toy member. These pulses turn the transistor 402 ON and OFF. Accordingly it gives a pulsing loading to the power line through the resistor 404. The amplitude of the pulses 421 and 422 are determined by the value of the resistor 404 and the internal impedance of the interfacing facing circuit at the master controller end. The pulses 421 and 422 are then processed by the electrical circuit at the master controller end. Responses are generated according to the pulses detected. The diode 405 of FIG. 4A is included to attenuate the pulsing signal to enter the power supply line 407 of the microcontroller circuit.

In order to determine when the microcontroller 401 should generate pulses and what kind of pulses can be generated, a trigger switch 410 is included in the circuit 400. The switch 410 is preferably be integrally positioned right behind the contact terminal 409, so that the switch 410 can be triggered by the same finger accessing the contact terminal 409. Another advantage of this design is that the electrical circuit can be set to a low power standby mode to conserve energy. The circuit is revoked to the normal operation mode only when this controller switch is triggered.

Figure 4C:
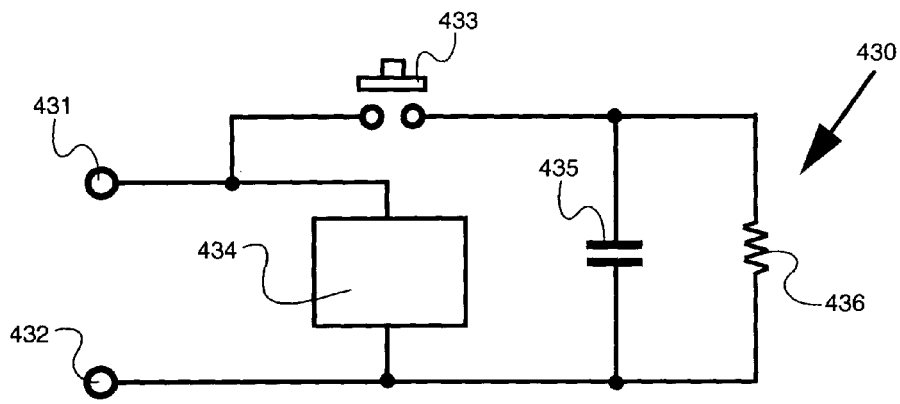
FIG. 4C is another interface circuit built inside an accessory toy member.

FIG. 4C illustrates another generic circuit applicable for the vehicle. The block 434 represents the working circuit of the vehicle. Triggering is provided by pushing the switch 433, which connects the capacitor 435 to the power line of the circuit. The capacitor 433 will provide a momentary negatively going triggering pulse 424 as shown in FIG. 4B. This trigger pulse will be useful to trigger the electrical circuit located at the controller end and to reset the electrical circuit 434. The resistor 436 is included for discharging the capacitor 435 when the trigger switch 433 is released.

Figure 5A:
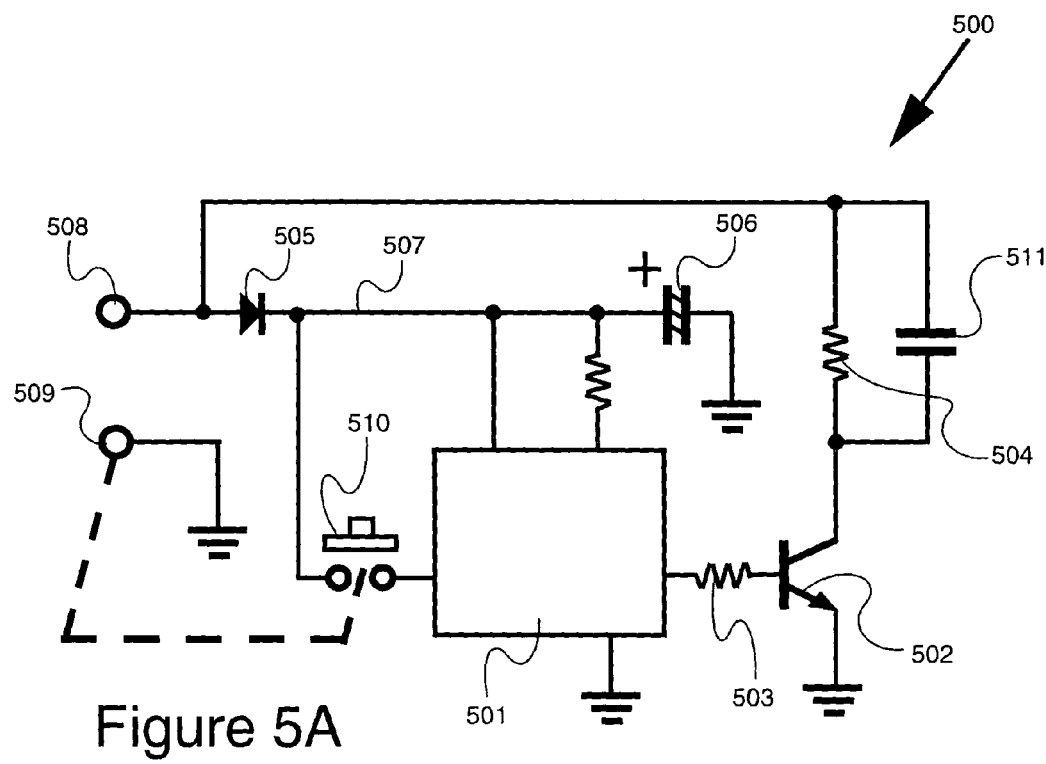
FIG. 5A is an example of a sound generating interface circuit built inside an accessory toy member.
Figure 5B:
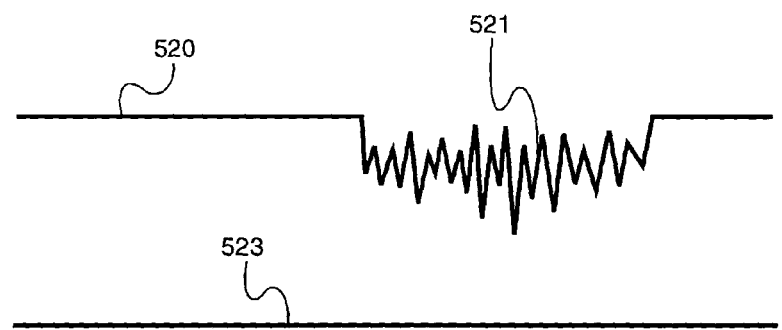
FIG. 5B is the waveform of the electrical current flowing through the contact terminals and the interface circuit of FIG. 5A.

FIG. 5A is a design alternative of FIG. 4A, wherein the functional block 501 generates an analog signal such as a voice waveform. This voice waveform is amplified by the transistor 502 and coupled to the contact terminal 508 by the capacitor 511. The DC voltage measured across the terminals 508 and 509 are represented by the voltage waveform 520 of FIG. 5B. The coupled AC signal is represented by the analog waveform 521 which is picked up by the master controller box through the finger contacts. These analog signals are extracted and amplified to drive a speaker located at the master controller end. Since the circuit 500 is not required to drive a speaker, a substantial high impedance resistor can be added in series with the contact 508 to define the internal impedance of the communication line and also to reduce the current flowing through the circuit 500.

Figure 6A:
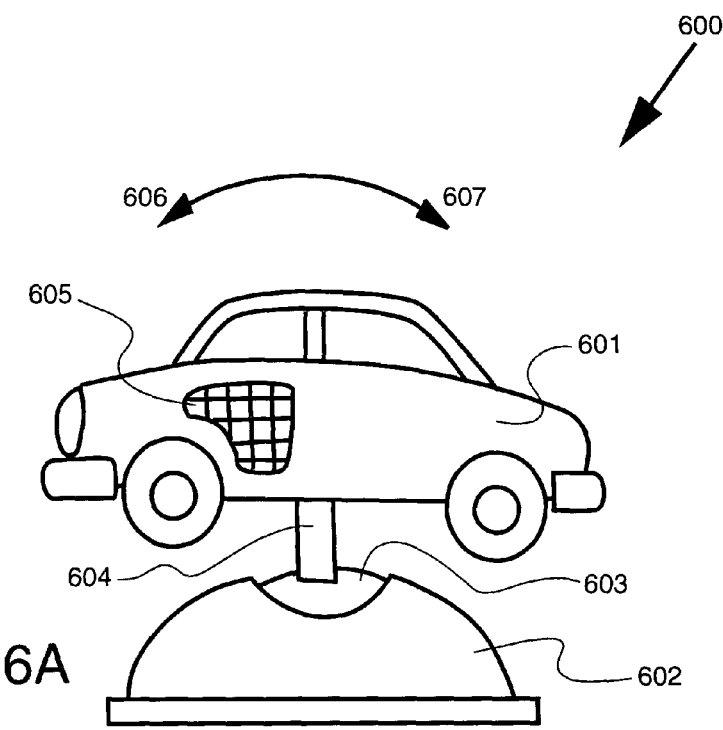
FIG. 6A illustrates a preferred embodiment of the joystick hand controller.

FIG. 6A illustrates the accessory motor vehicle 601, which is inserted to the top of the joystick 604 to form a compound hand controller. When the position of the vehicle 601 is moved relative to the base 602, driving signals in serial packet of pulses are sent to the controller box through the finger contacts 605 located at the two sides of the vehicle 601. When the vehicle 601 is moved towards the direction 606, a move forward signal, or acceleration signal is generated. When the car 601 is moved backward in the direction 607, a braking signal is generated to slow down the racing car on the LCD screen. It is preferable to provide a digital signal indicating the magnitude of movement of the vehicle in the directions 606 and 607 so that the speed of the vehicle can be properly controlled.

Figure 6B:
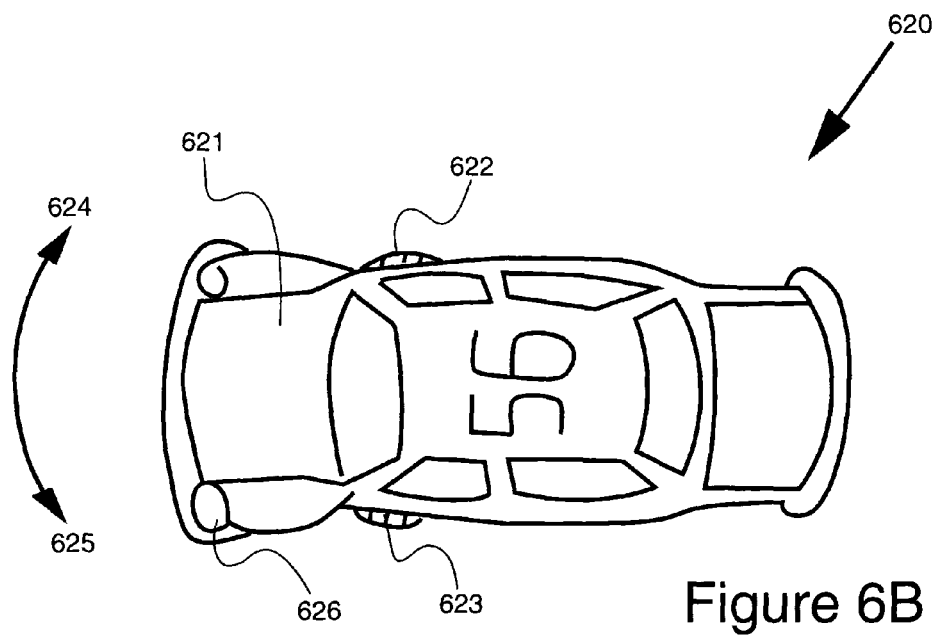
FIG. 6B illustrates the top view of the joystick hand controller of FIG. 6A.

FIG. 6B illustrates the top view of the accessory vehicle 601. When the vehicle is turned towards right in the direction 624, a right turn signal is sent. Similarly a left turn signal is sent when the vehicle is steered towards the direction 625. Digital proportional steering is also preferable to provide smoother steering control to the racing vehicle.

FIG. 7A illustrates an embodiment of the joystick hand controller. The guiding plate 705 and housing 704 represent the plate 603 and the housing 602 of FIG. 6A respectively. The joystick 701 is inserted into the bottom plate of the racing vehicle 601 of FIG. 6A. The contact points 702 and 703 are connected to the electrical circuit located inside the vehicle so as to receive the identity signal or to exchange information with the racing vehicle. The contact plates 706, 707, 708 and 709 represent the simple version of switch to indicate the directional movement of the vehicle. When the central contact plate 706 is in contact with the contact plate 707, the car is in forward moving direction. Contact plate 708 is positioned to determine the braking position of the controller. A microprocessor 712 picks up all these directional signals and sends it to the master controller box through the connector 714 as illustrated in FIG. 2. FIG. 7B illustrates the contact design to define steering directions. When the contact plate 721 is in contact with the contact plate 722, a right steering signal is sent. When the contact plate 721 is in contact with the plate 723, a left steering signal is then transmitted. FIG. 7C is another preferred embodiment of the steering mechanism replacing the contact plates of FIG. 7B to provide digital proportional signals that measures the steering angle. The analog resistance value of the potentiometer 732 is converted into digital steering signals to be sent to the controller box. It should be noted that digital proportional signal is also preferred to simple contact switches for accelerating or braking the racing vehicle.

Figure 8A:
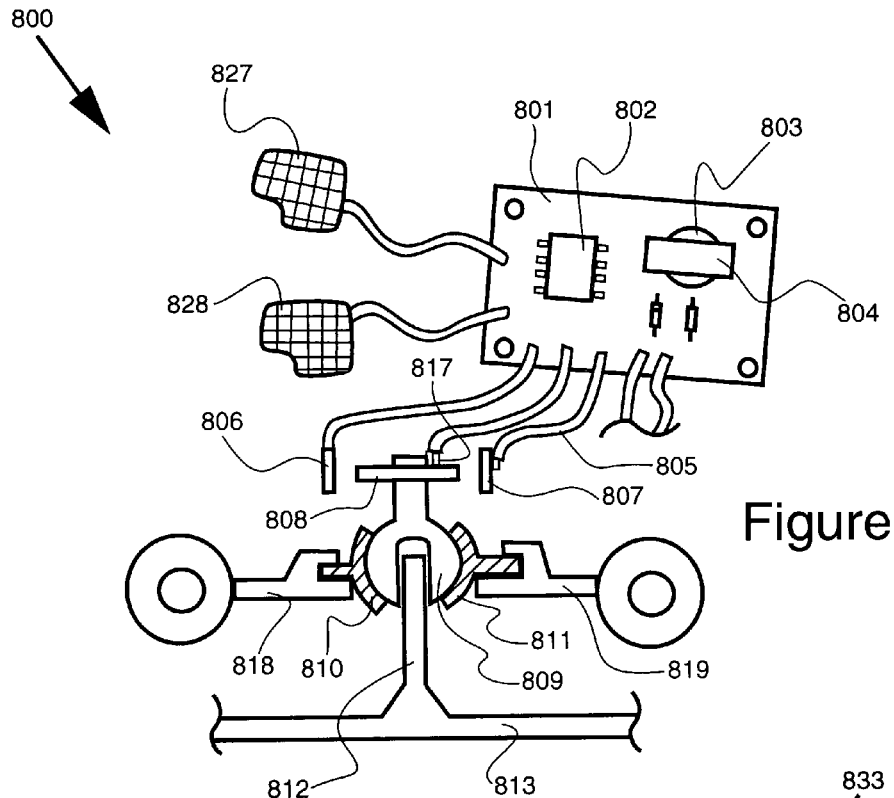
FIG. 8A illustrates the internal structure of a joystick embodiment for use with the embodiment of FIG. 1.

FIG. 8A illustrates another preferred embodiment that moved the control mechanism and electronics from the joystick supporting base into the motor vehicle. Accordingly the joystick supporting base 813 is a simple supporting base that provides the solid joystick 812, which is inserted into a ball joint 811 located beneath the vehicle 818. The control movement of the vehicle enables the contact 827 to touch the contact plates 807 and 806 to signify acceleration or braking motions. All these control signals, together with the steering signals are fed to the controller box through the contact pads 827 and 828 by the microprocessor 802, as shown in the embodiment of FIG. 1. It should be noted that the ownership and/or upgrade information of a vehicle can be stored inside a vehicle. In order to retain these information data after the power supply derived from the master controller box is removed from the controller pads 827 and 828, a nonvolatile memory is provided for the electrical circuitry 804. Alternately a local back up power supply represented by the battery 803 is provided to maintain the information stored in the low standby current memory of the circuit board 801.

Figures 8B, 8C:
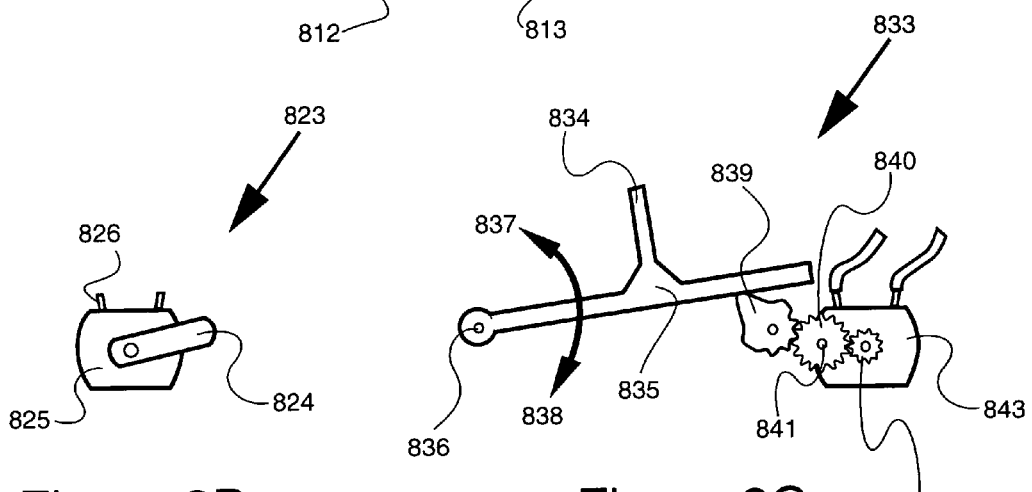
FIG. 8B illustrates a motor providing vibrating effect to a platform holding an accessory toy member, or the master controller box or the joystick embodiment.
FIG. 8C illustrates an alternate motor mechanism providing vibration to a joystick assembly.

FIG. 8B illustrates a motor 825 installed inside the racing vehicle. This motor is connected to an uneven load 824 which when rotates, provides a vibration to the racing vehicle, that increases the fun and feeling of racing. FIG. 8C illustrates an alternate embodiment to provide a different kinds of vibrations simulating an off road racing. The motor 843 is geared down to drive an irregular shaped cam 839, which in turn moves the joystick base 835 up and down.

Although FIG. 1 illustrates the vehicle to be controlled by the right hand of the player having a glove attached with the master controller box, alternate embodiment is possible to provide a left handed glove to hold the joystick base 104. This will enable the master+controller box attached to the left handed glove to maintain finger contact with the base 104 so as to communicate with the electrical circuit as shown in FIG. 7A. In this arrangement, the racing vehicle is controlled by the right hand without wearing the glove.

Figure 9A:
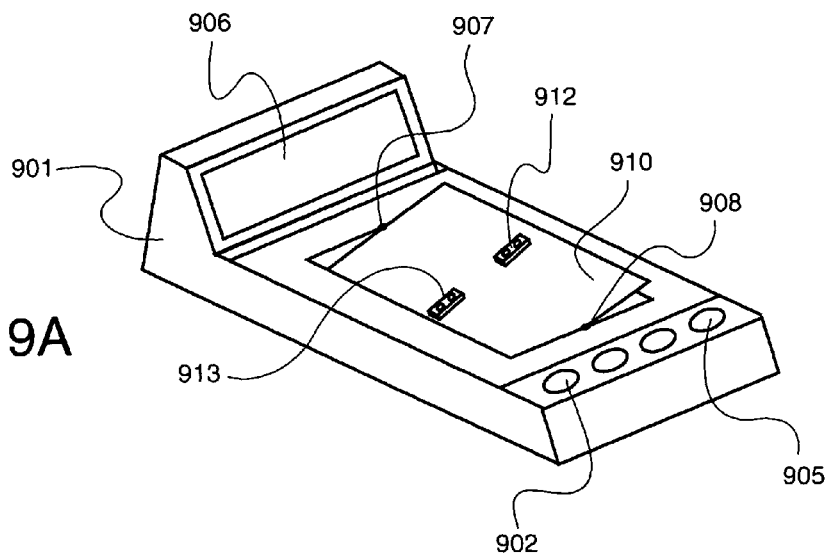
FIG. 9A illustrates an embodiment of a portable racing game.
Figure 9B:
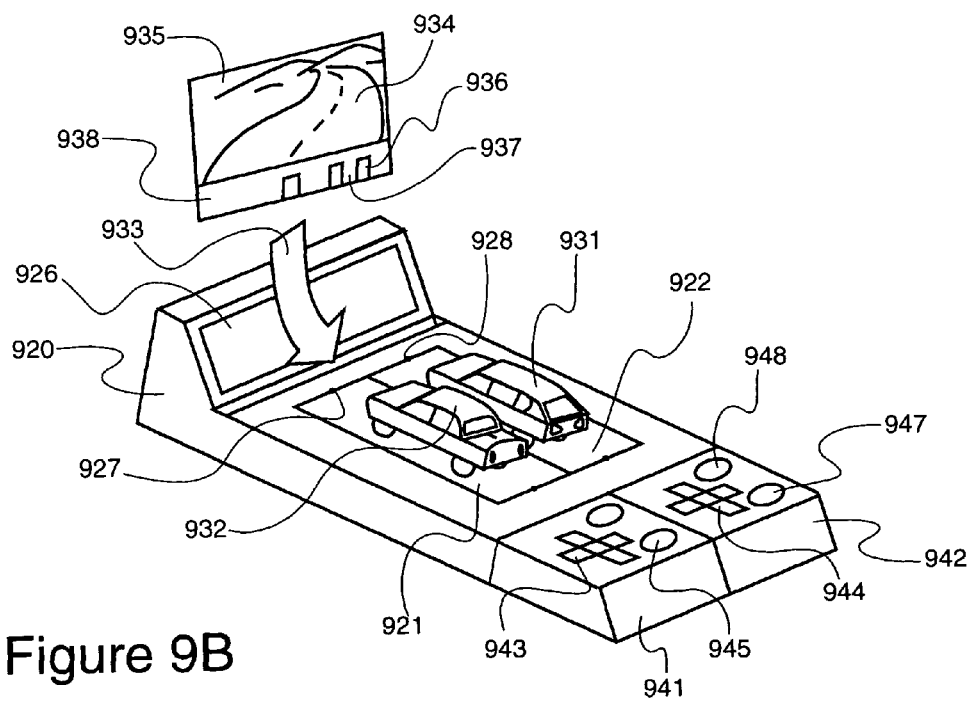
FIG. 9B is a modification of the embodiment of FIG. 9A with pictorial game mode selection and dual hand controllers.

FIG. 9A illustrates a portable master game unit 901 having a display area 906, a platform 910 pivoted at the points 907 and 908, and game control buttons 902 to 905. On top of the platform 910 are two receivers provided to interface with two accessory racing vehicles, Beneath the platform is a mechanism analogous to that of FIG. 8C for providing movement to the vehicles on top. FIG. 9B. Illustrates an enhanced embodiment of the master game unit of FIG. 9A. A mode selection game card 935 is provided for the master toy unit to determine which kind of racetrack is ready for the next race. The pictorial card comprises an Identity area 938 storing encoded data. The encoded data can be detected by suitable electronics, magnetic or optical means. In this embodiment, the slot 936 and tap 937 are part of the encoding system allowing the master toy to know which race track is selected for the next round of racing. Instead of a single platform to receive a racing car, two separated movable platforms 921 and 922 are provided for the racecars 931 and 932, so that they can move separately. Two hand controllers 941 and 942 are provided for two users to compete with their selected racecars for the racetrack defined by the card 935. It should be noted that for the embodiments of FIGS. 9A and 9B, the memory storing personality data of the vehicles are preferred to be installed inside each accessory race car. Instead of a resistor identification circuit, the memory device positioned inside each accessory toy may be configured to generate identity signal to the master toy unit. It should be noted that a hand controller of the toy play set is defined as any structure configured for transducing manual movement or motion into electrical signals recognized by a microcontroller. Accordingly the control pads 943, 944 and the joystick of FIG. 6A, 8A are all classified as hand controllers. For the avoidance of doubt, it should be noted that the accessory toy members described and claimed in this application and the game cartridge storing memory, or storing a game program, such as the cartridge members 1017 and 1018 are all not considered to be a hand controller, as they failed to satisfy this specific definition.

Figure 10:
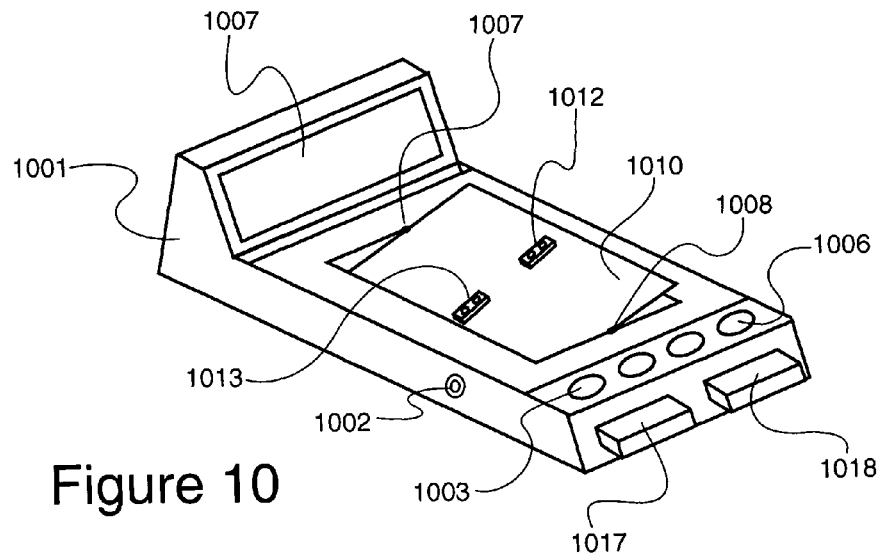
FIG. 10 illustrates an alternate version of the embodiment in FIG. 9A to accept two memory cartridges, each structured to store data representing the personal characteristics for a collection of accessory toy members.
Figure 11:
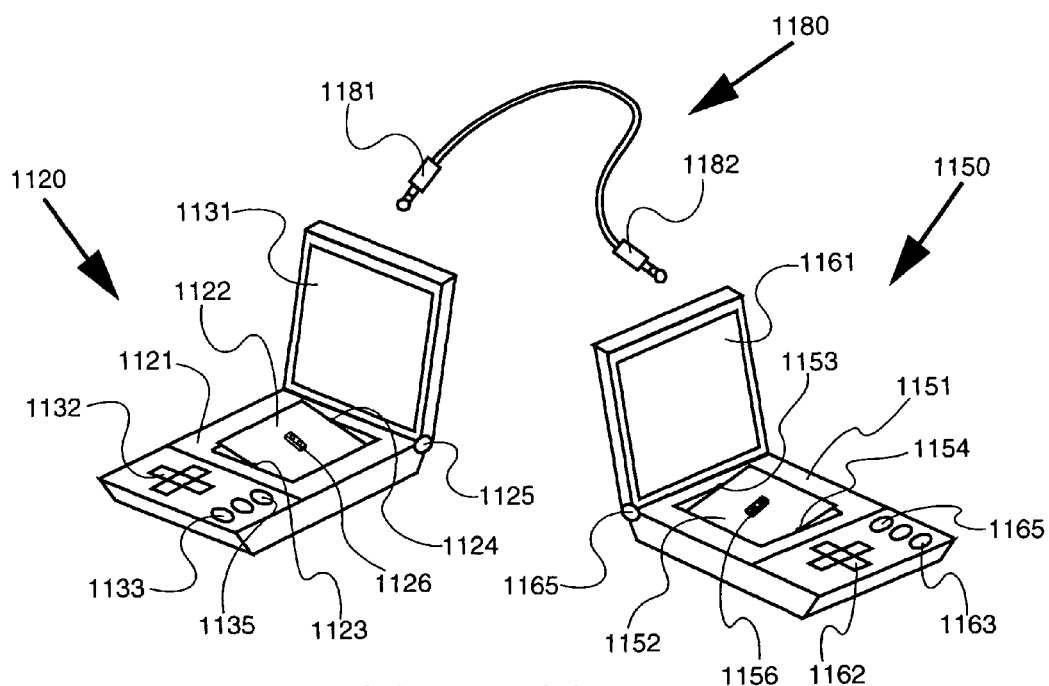
FIG. 11 illustrates two stand alone master toy members connected for two users to compete in a game play.

FIG. 10 illustrates an alternate embodiment having two memory cartridges 1017 and 1018, one for each player. This is a low cost way to store the personality information of the accessory toys because a single memory cartridge will store the data of the whole feet of racing cars belong to a user. At the sides of the master game unit 1001 are the communication sockets 1002 that receives separated hand controllers for the two users to compete at a racing game. FIG. 11 illustrates two miniature portable master racing game units, each owned by a user. The two units are interconnected by a wired or wireless communication means. The cable 1180 represents a wired communication channel. In this case the memory device storing the personal data of the racing vehicles is installed inside the housing of each master unit 1120 and 1150 instead of the two memory cartridges 1017 and 1018 as shown in FIG. 10. It should be noted that this memory device may also be embedded inside the microcontroller IC positioned Inside the master toy unit.

Figures 12B, 12C:
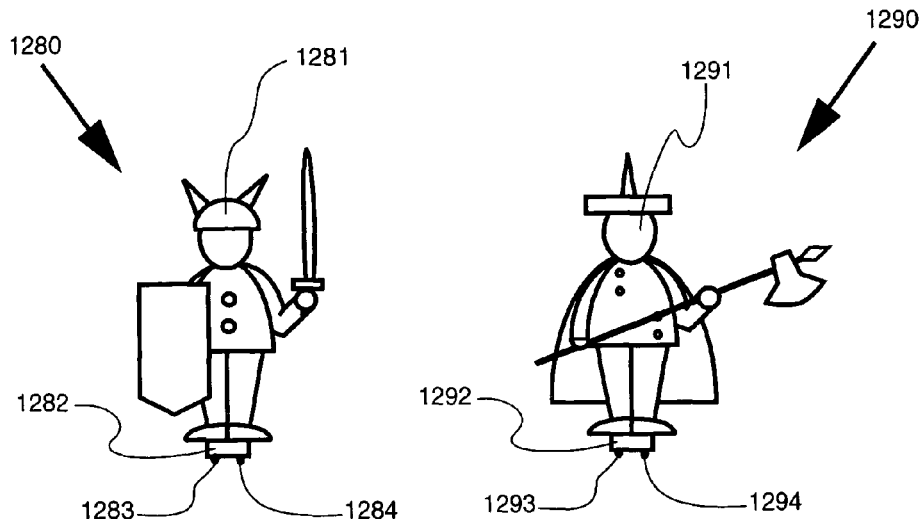
FIG. 12B illustrates a first embodiment of an action figure having two contacts points provided at the base.
FIG. 12C illustrates a second embodiment of an action figure having two contacts points provided at the base.
Figure 12A:
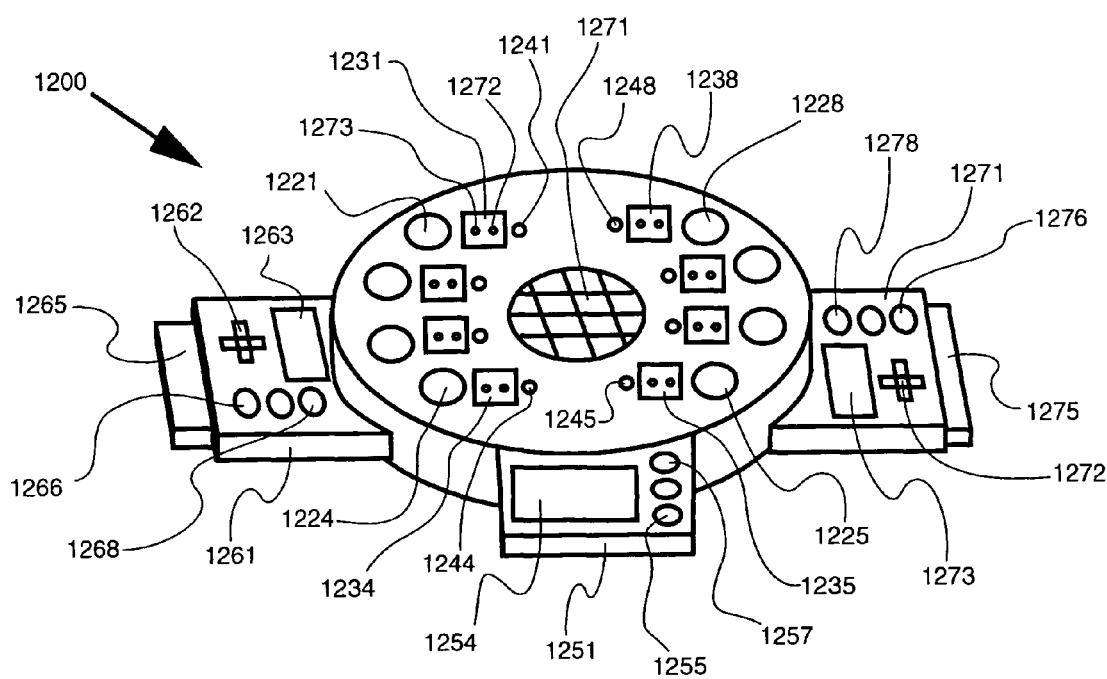
FIG. 12A illustrates an alternate strategic game embodiment for two users to play with multiple accessory action figures arranged on a platform.

FIG. 12 A illustrates an alternate embodiment of the invention where the accessory toy members are represented by a family of male action figures. The master toy unit in the shape of a platform comprises a display area 1254 and control buttons 1255 to 1257. On top of the platform are the receivers 1231 to 1238. Each receiver has two contact sockets as illustrated in the contact areas 1272 and 1273. Next to each receiver is an array of LEDs 1241 to 1248. On the other side of each receiver is an array of push buttons 1221 to 1228. The LEDs can be turned on according to a game program to indicate which toy figure is active or selected. The corresponding push button is a feedback device that allows the game program to prompt the user to select or activate any action figure in a game play. At the two sides of the platform are two hand controllers that enable two users to combat with their elected toy figures. The memory storing the personality data of each toy figures may be built inside each figure or contained in the two user specific memory cartridges 1265 and 1275. In an alternate embodiment, each of the two hand controllers are configured as a mini master controller that allow an user to play solo with one or two accessory toy members previously described. The two mini master controllers are then plugged into the bigger platform shaped master member for expanded game play with more action figures.

Although all accessory toy members illustrated are provided a three dimensional shape, a lower cost construction can be formed by providing a generic base housing. On top of the base housing is a pictorial representation of the accessory toy, such as a racing car or an action figure.

Figure 13:
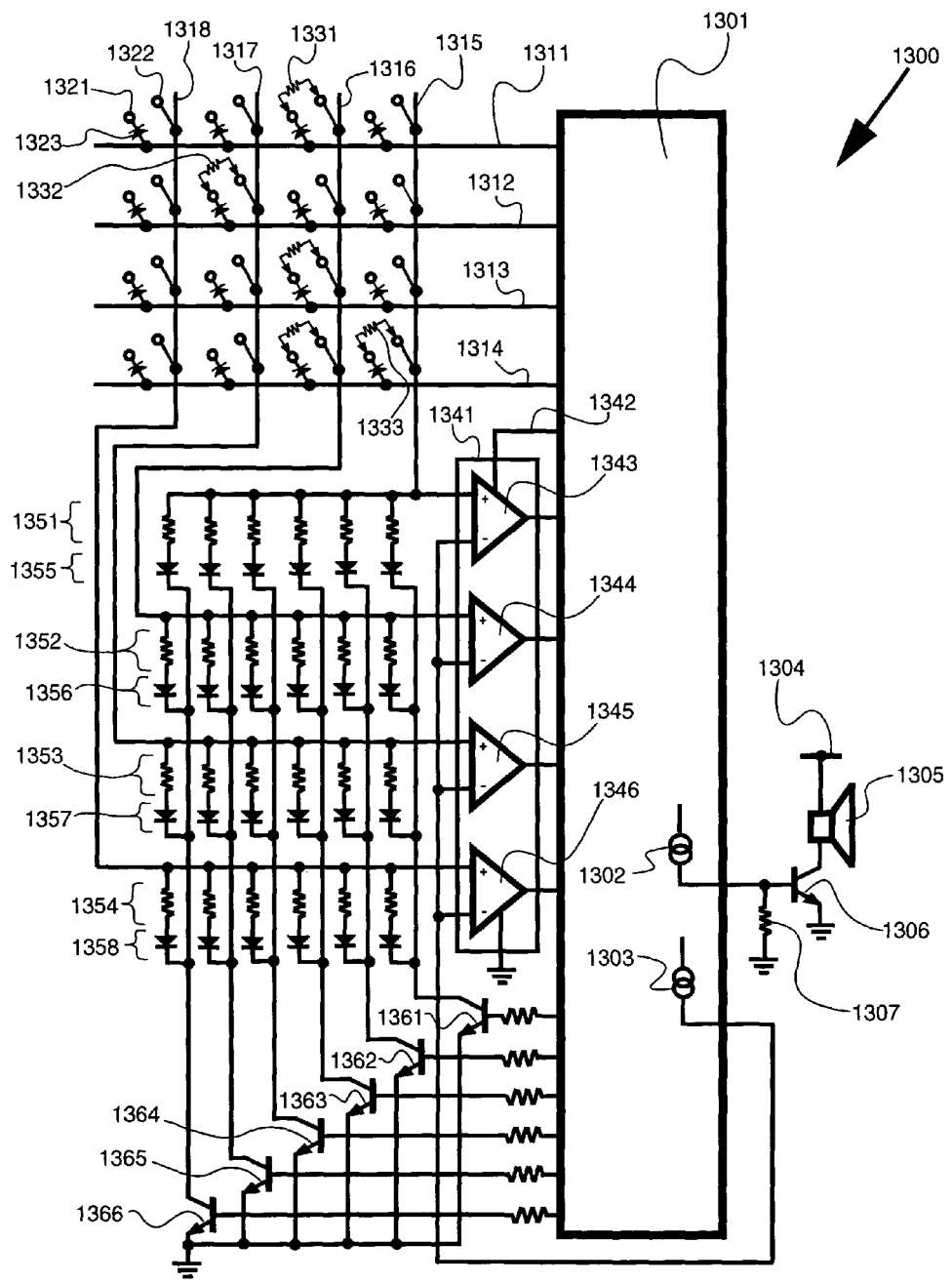
FIG. 13 discloses an electronics circuit capable for multiple accessory toy members to be received and identified by a master toy member at the same time.

The simultaneous participation and recognition of different accessory toy members forms an important part of the game play. Different kinds of identity recognition circuit are disclosed in the parent patent applications. FIG. 13 is a four dimensional version of an identification circuit which recognizes an array of accessory toy figures received by the master toy member of FIG. 12A. Two of the dimensions are defined by the 4×4 matrix or array of receivers formed by the columns 1315 to 1318 and the rows 1311 to 1314. The row lines are controlled the output pins of microcontroller 1301. The column line 1315 is connected to an array of reference resistors 1351 and the input pin of the comparator 1343. Similarly each of the other column lines is connected to an independent array of reference resistors and a comparator. The series diodes 1323 of the receivers enable different external resistors to be connected to different receivers at the same time without affecting the resistance identification process. The switching transistors 1361 to 1366, controlled by the microcontroller 1301 turn on and off each group of reference resistors. For example, the switching transistor 1361 may be configured to turn on the four reference resistors of 100 ohm value, enabling the identification circuit to detect external resistors close to the 100 ohm resistance range. The switching transistor 1366 is configured to turn on the four reference resistors of 500 kohm value allowing the circuit to measure external resistors in the range higher than 100 kohm. The diodes arrays 1355 to 1358 ensure the reference resistors are disconnected from the comparator circuit when a switching transistor is turned off. If the output pins of the microcontroller provide adequate current sinking capability, the interfacing transistors 1361 to 1366 may not be required.

During the measurement process to identify the resistance of resistor 1333, the output line 1314 is turned high to provide a current to flow through the resistor 1333 and the reference resistors 1351 beneath. The switching transistors 1361 to 1366 are turned on one by one to select one of the arrays of resistors connected to the input circuit of the comparator 1343. The output of the comparator 1343 is monitored to see which reference resistor is of closest range to the external resistor 1333. Each member of the arrays of diodes 1355, 1356, 1357 and 1358, is connected in series with a reference resistor. This circuit design enables the same value resistor of each array of reference resistors to be turned on at the same time. When the closest reference resistor is identified, the D/A converter 1303 of the microcontroller 1301 successively provides a feedback reference voltage to compare with the input voltage formed by the potential divider of the external resistance 1333 and the selected reference resistor of the array 1351 selected. The microcontroller successively changes the value of the reference voltage derived from the source 1303 until the exact input potential dividing voltage is detected. The digital value provided to the internal D/A converter at this time represents the unique resistance of the external resistor 1333, and also the personality of the accessory toy member or figure that holds the external resistor 1333. The microcontroller 1301 then provides responses according to the unique value of the resistors 1333 detected. Additional comparators 1344, 1345, 1346 and additional arrays of reference resistors 1352, 1353, 1354 support the additional columns of receivers 1316, 1317, 1318 and speed up the multiple external resistors identification process. Audio responses are provided through another D/A converter, which converts internal digital data into audio signal to drive the electricity to sound transducer 1305 through the transistor 1306. Visual responses can be provided by other output pins of the microcontroller 1301 not shown in the circuit. If more D/A converters are available, each comparator of the array 1341 can be connected with a different D/A converter to provide a more efficient multitask identification process.

Since most external comparator array is a circuit component that continuously consumes power, in order to conserve the power of the battery operated toy play set, it is preferable to control the power supply of the comparator by another output pin 1342 of the microcontroller 1301. Output pin 1342 can be connected directly to the power supply line of comparator IC 1341 or through a driving transistor depends on the current capability of the out pin.

From the foregoing, it should now be appreciated that the applicant has disclosed herein embodiments of a master toy member to work with a family of accessory toy members each is upgradable by the user. Embodiments are disclosed as a strategic toy play set for two users to select their own accessory three dimensional accessory toy members of choice and to compete with each other. It should be noted that there are different variations of master and accessory toy designs, different types of game plays and different ways to organize the internal components. Although detailed embodiments of the invention have been disclosed, it is recognized that variations and modifications, all within the spirit of the invention, will occur to those skilled in the art. It is accordingly intended that all such variations and modifications be encompassed by the appended claims.

What is claimed is:

1. An electronics toy play set comprising:
    a master toy member having at least a first and a second receivers for receiving at least a first and a second accessory toy member respectively;

said master toy member further comprising a third and a fourth receivers for receiving at least a first and a second memory cartridge respectively;

at least a first and a second groups of accessory toy members each equipped with an electronics identification circuit configured for said master toy member to recognize the identity of the accessory toy members received;

a first memory cartridge to be connected with said master toy member; said first memory cartridge comprises a first memory means programmed to store data defining the personal characteristics of said first group of accessory toy members belong to a first user; and a second memory cartridge to be connected with said master toy member; said second memory cartridge comprises a second memory means programmed to store data defining the personal characteristics of said second group of accessory toy members belong to a second user;

said first and second cartridge are separated from any of said groups of accessory toy members; wherein neither of said memory cartridges is an accessory toy member.

2. The electronics toy play set of claim 1 comprising a first group of three or more electrical receivers, and a second group of three or more electrical receivers; wherein said first group of electrical receivers is structured to receive accessory toy members selected from said first group of accessory toy members belong to a first user; and said second group of electrical receivers is structured to receive accessory toy members selected from said second group of accessory toy members belong to a second user.

3. The electronics toy play set of claim 2 further comprising a game program directing each selected accessory toy member received by said first group of receivers to combat, compete or play with the corresponding accessory toy member received by said second group of receivers.

4. The electronics toy play set of claim 2 wherein said master toy member further comprising program storage means storing a game program enabling said first and second users to play with each other in accordance to the accessory toy members selected by said users.

5. The electronics toy play set of claim 1 wherein said master toy member further comprising a hand controller comprising a structure configured to control a game play by hand; said structure is further configured to directly receive one of said accessory toy members.

6. The electronics toy play set of claim 1 further comprising a motorized mechanism structured on said master toy member to provide movement for an accessory toy member when it is received by said master toy member.

7. The electronics toy play set of claim 1 further comprises a family of external mode defining members each defines a specific game or game mode to be played by said master toy member, wherein said master toy member further comprises a mode defining receiver to receive a mode defining member so as to determine the selected game or game mode to be played.

8. The electronics toy play set of claim 1 wherein said master toy member further comprising a microcontroller configured to control operation or access data of said first, second receivers and said first, second memory cartridges.

9. The electronics toy play set of claim 1 wherein multiple accessory toy members are connected to said master toy member, and said master toy member further comprises a circuit configured for a user to select or activate one of said multiple accessory toy members.

10. An electronics toy play set comprising:
a first master toy member having at least at least one receiver configured for receiving an accessory toy member;
at least a first and a second accessory toy members each equipped with an electronics identification circuit configured for said first master toy member to recognize the identity of an accessory toy member received;
memory or memory means programmed to store data defining the personal characteristics of one or more of said first and second accessory toy members; wherein
said first master toy member further comprises a movable mechanism structured to connect said first master toy member with said external accessory toy member; wherein
said movable mechanism is further configured for providing a hand controller to control a game by hand.

11. The electronics toy play set of claim 10 wherein said first accessory toy member is structured to provide one of the following forms:
(a) a vehicle
(b) a figure
(c) a printed picture and a housing accommodating an electronics identification means.

12. The electronics toy play set of claim 10 further comprising
a second master toy member having at least one receiver for receiving an accessory member; wherein said first and second master toy members are configured to be played by a first user and a second user;
wherein said electronics toy play set further comprises a memory, or memory means, or program storage means storing a game program enabling said first and second users to play with each other in accordance to the identities of accessory toy members selected by said first and second users.

13. The electronics toy play set of claim 10 wherein the control of game play is provided by moving said accessory toy member received by said hand controller.

14. The electronics toy play set of claim 10 further comprising at least one of the following characteristics:
(a) said first master toy member further comprising a motorized mechanism structured on said first master toy member to provide movement for an accessory toy member when it is received by said hand controller;
(b) at least one of said accessory toy member further comprising a motor configured to provide movement for said accessory toy.

15. The electronics toy play set of claim 10 further comprising a mode receiving member configured for receiving a mode defining member and for selecting a game or game mode to be played in accordance to the mode defining member received by said first master toy member.

16. The electronics toy play set of claim 10 further comprising a first memory or a first memory means locates inside the housing of said first master toy member as the only resource of said electronics toy play set to store the personal characteristic of said first and second accessory toy members.

* * * * *